United States Patent [19]
Oppedisano et al.

[11] Patent Number: 6,045,222
[45] Date of Patent: *Apr. 4, 2000

[54] HEAD MOUNTED SPECTACLES

[76] Inventors: Giuseppe Oppedisano, 99 Av. Cyrille Besset, O-600 Nice, France; Umberto Bonora, 75/5 V. Bologna; Federica Maccelli, V.V. Veneto 22, both of 50047 Prato, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/986,125

[22] Filed: Dec. 5, 1997

[51] Int. Cl.[7] .................................................... G02C 5/14
[52] U.S. Cl. ........................... 351/121; 351/111; 351/156
[58] Field of Search .................................... 351/156, 157, 351/158, 63, 41, 121, 111

[56] References Cited

U.S. PATENT DOCUMENTS

| | | | |
|---|---|---|---|
| 182,013 | 9/1876 | Andross | 351/156 |
| 401,682 | 4/1889 | Brust | 351/121 |
| 1,819,738 | 8/1931 | Daniels | 351/156 |
| 3,209,755 | 10/1965 | McCarthy et al. | 351/121 |
| 4,268,130 | 5/1981 | Vinocur | 351/121 |
| 5,120,119 | 6/1992 | Mats | 351/156 |
| 5,144,820 | 9/1992 | Holmgren | 351/121 |

*Primary Examiner*—Hung Xuan Dang
*Attorney, Agent, or Firm*—Wood, Phillips,VanSanten, Clark & Mortimer

[57] ABSTRACT

Spectacles without support and contact on either the nose or on the face. It is constituted by a system of suspension and support comprising: bars in contact with the superior temporal region, prolongations of the bars in contact with the occiput on the posterior part of the head and on each bar, projections of support in contact with the temporal region directly anterior to the ear. The bars with their prolongations can constitute a single "U"-shaped element which surrounds completely the posterior part of the head. The present invention is specially meant to wear spectacles without support and contact on the face.

7 Claims, 3 Drawing Sheets

SLIDE AND LOCK MECHANISM

HEAD MOUNTED SPECTACLES

BACKGROUND OF THE INVENTION

1. Field of the Invention

The present invention provides spectacles which haven't support and contact on either the nose or the face.

2. Background Art

Usually, the stability of spectacles is due to their resting on the nose which causes several disadvantages: spectacles slide on the nose and exert their weight on it.

SUMMARY OF THE INVENTION

It is therefore an object of the present invention to provide spectacles which haven't support and contact on either the nose or on a face. It provides spectacles comprising: lenses, a frame, and a system of suspension. The above mentioned system comprises bars, prolongations of the bars and projections of the bars, which make a system of suspension and support which guarantees the stability of the spectacles. The above-mentioned system of suspension and support comprises the bars in contact with the superior temporal region; the prolongations of the bars in contact with the occiput on the posterior part of the head, and the projections on the bars extending downwards and in contact with the anterior temporal region of the ears. The system of suspension is based on the following points: under the occipital part with the prolongations; on the ears; on the anterior temporal zone of the ears, and laterally with the bars. The movement forwards and backwards is not allowed by the projections and the prolongations of the bars. The movement towards left and right is not allowed by the lateral bars. The rotation downwards is not allowed by the prolongations and the support of the bars on the ears and by the projections. The result is a very good stability although they don't have any contact on the nose or on the face. In this way spectacles are much more comfortable. In fact, the face is completely free from any kind of contact. Spectacles don't slide at all: they don't slide downwards on the nose because of the prolongations of the bars arriving to the occiput on the posterior part of the head; they don't slide backwards pressing against the face because of the projections on the bars which prevent the spectacles from sliding towards the eyes. The prolongations of the bars can constitute a single "U"-shaped element which surrounds completely the posterior part of the head. In this case, the projections may be omitted as well as the bridge of linking between the lenses. In this case lenses might not be linked with a bridge. The bars could present a slide-and-lock mechanism for the right setting of the projections and of the length of the bars themselves.

The projections might be fixed on the bars or made part of them.

The projections might also result from a folding of the bars.

In a particular folding of the bars descend along the anterior temporal region forming a projection of support then they go to the lenses.

There can be used shape-memory materials.

BRIEF DESCRIPTION OF THE DRAWINGS

The present invention will now be described with reference to the drawings.

DETAILED DESCRIPTION OF THE DRAWINGS

Figure 1:
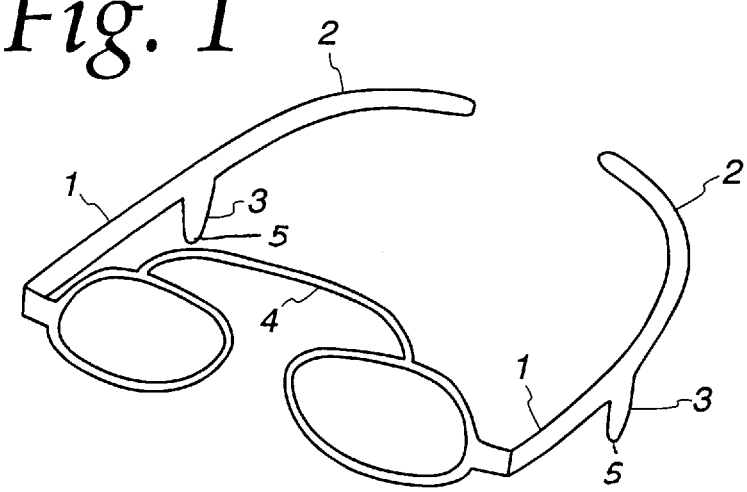
FIG. 1 is a perspective view showing spectacles constructed according to the present invention.

Referring to FIG. 1, there are illustrated spectacles which comprise bars 1, prolongations 1 of the bars 2 and, on each bar 1, a projection 3 of support. Lenses are linked to each other with a bridge 4. The projections 3 protrude themselves in cantilever fashion downwards from each bar 1 and terminate at a free end 5 below each bar 1; they can make part of the bars 1 or be fixed on them.

Figure 2:
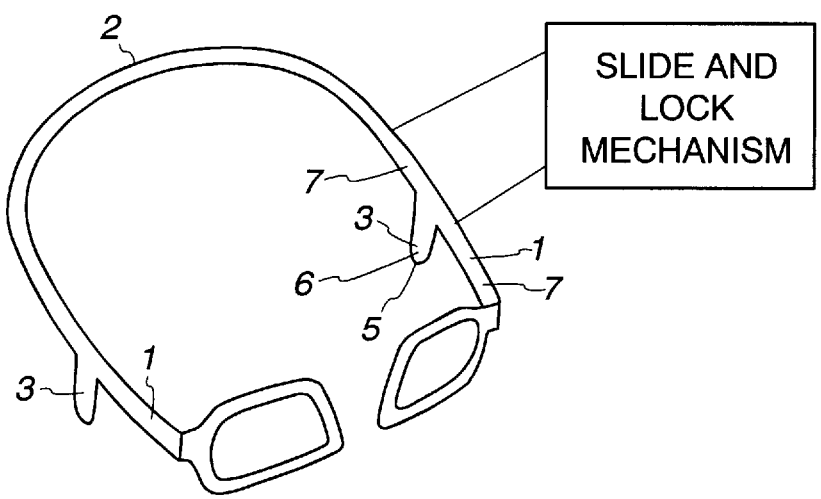
FIG. 2 is a perspective view showing a modification of the spectacles shown in FIG. 1.

Referring to FIG. 2, the prolongations 2 of the bars 1 constitute a single "U"-shaped element which surrounds completely the posterior part of the head. In this case the spectacles require no bridge 4 of linking between the lenses.

According to a solution shown in FIG. 2, the bars 1 have a slide-and-lock to mechanism for the right setting of the position of the projections 3 and of the length of the bars 1 themselves.

Figure 3:
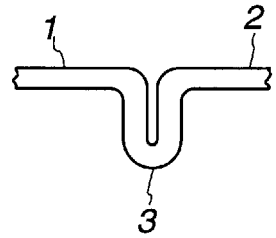
FIG. 3 is an enlarged, fragmentary, elevation view of a part of a bar on the inventive spectacles.
Figure 5:
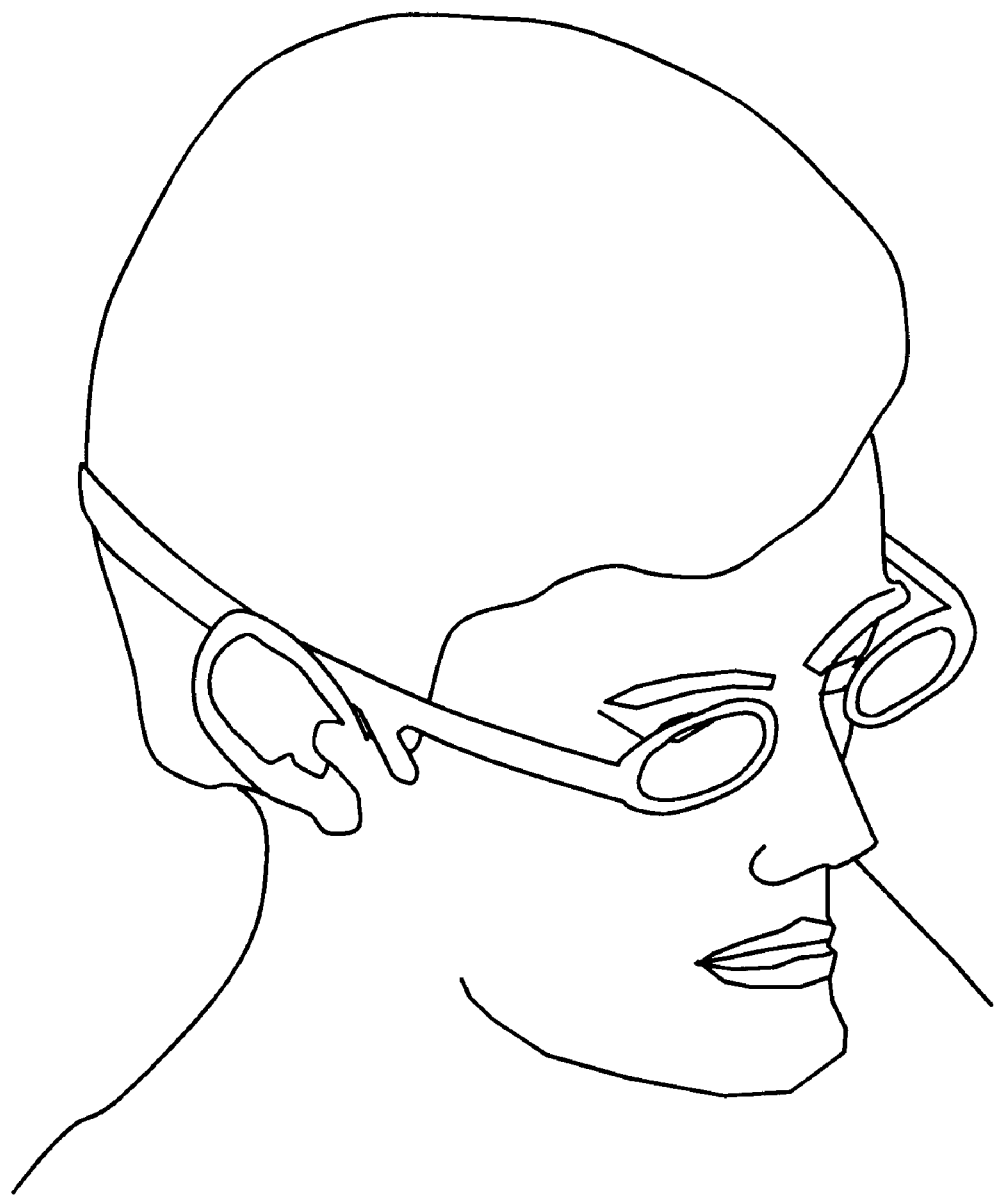
FIG. 5 is a front, side, and top perspective view of the spectacles in FIG. 2 being worn by a user.
Figure 6:
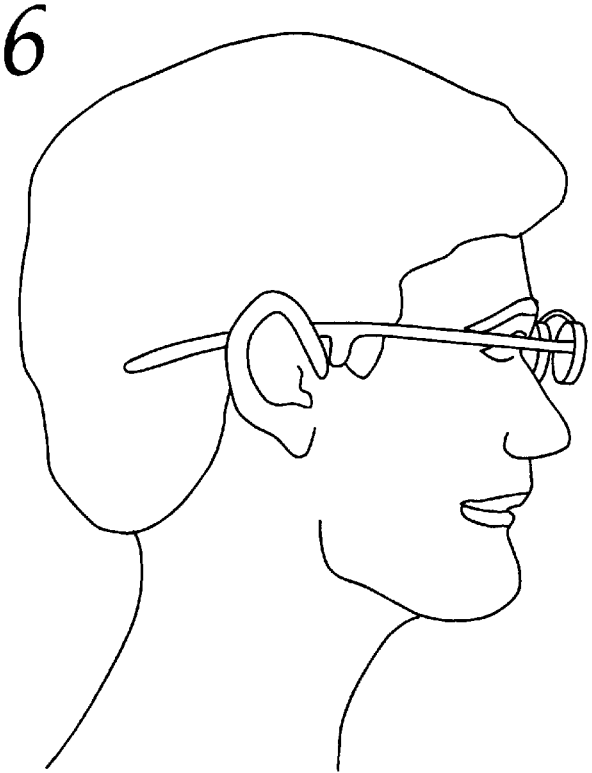
FIG. 6 is a side elevation view of the spectacles in FIG. 5 being worn by a user.
Figure 7:
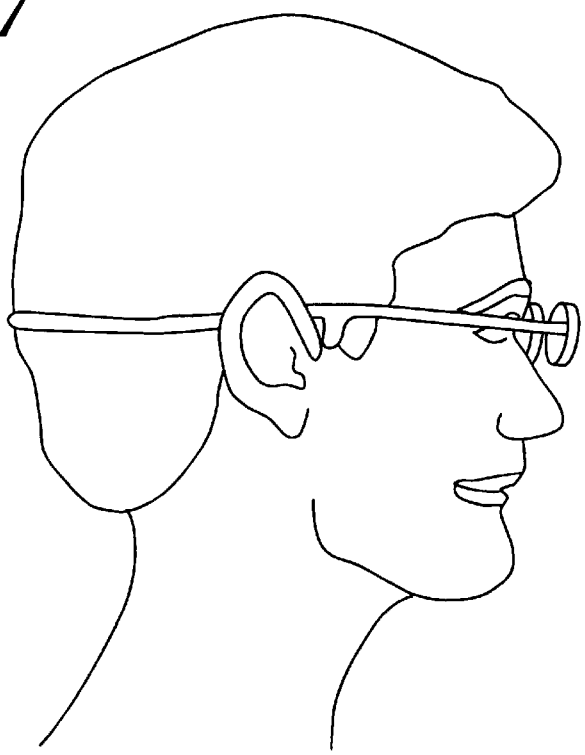
FIG. 7 is a side and rear perspective view of the spectacles in FIG. 2 being worn by a user.

A modified form of the projections 3 is illustrated in FIG. 3. In this form, the projections 3 result from a folding of the bars 1.

Figure 4:
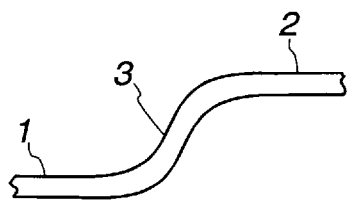
FIG. 4 is an enlarged, fragmentary elevation view of another part of a bar on the inventive spectacles.

Referring now to FIG. 4, there is shown another modified form of the projections 3 in which the bars 1 descend along the anterior temporal region of the ear then continue to the lenses. As seen in FIG. 2, the projections each have a head-engaging surface 6 which blends smoothly into a head engaging surface 7 on each bar 1. The free end 5 is rounded.

The present invention provides spectacles which haven't support and contact on either the nose or on the face.

We claim:

1. Spectacles comprising:

first and second laterally spaced lenses;

a first bar projecting in a rearward direction from the first lens;

a second bar projecting in a rearward direction from the second lens;

a first projection extending in cantilever fashion from the first bar to contact the anterior temporal region of one ear on a head of a wearer with the spectacles in an operative position on the wearer's head and terminating at a free end below the first bar; and a second projection extending in cantilever fashion from the second bar to contact the anterior temporal region of the other ear on the head of a wearer with the spectacles in the operative position on the wearer's head and terminating at a free end below the second bar, the first projection being a fixed part of the first bar, the second projection being a fixed part of the second bar, there being no part on or between the lenses at the front of a wearer's head to engage the wearer's head to support the spectacles in the operative position on the wearer's head, the first and second bars being connected to each other at a location behind the face of a wearer with the spectacles in the operative position on the wearer's head.

2. The spectacles according to claim 1 wherein the first bar has a length and the first bar has a slide-and-lock mechanism for selectively varying the length of the first bar.

3. The spectacles according to claim 1 wherein there is a single piece that defines at least part of the first projection and the first bar.

4. The spectacles according to claim 1 wherein the first and second lenses do not contact a wearer's head with the spectacles in the operative position on a wearer's head.

5. The spectacles according to claim 1 wherein there is no part of the spectacles that contacts a wearer's nose with the spectacles in the operative position on a wearer's head.

6. The spectacles according to claim 1 wherein the first and second bars each contact the superior temporal region of the head of a wearer with the spectacles in the operative position on the wearer's head.

7. The spectacles according to claim 1 wherein the spectacles comprise a shape-memory material.

* * * * *